United States Patent
Hirase

(10) Patent No.: US 8,563,158 B2
(45) Date of Patent: Oct. 22, 2013

(54) LITHIUM SECONDARY BATTERY

(75) Inventor: Masaki Hirase, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 286 days.

(21) Appl. No.: 13/078,558

(22) Filed: Apr. 1, 2011

(65) Prior Publication Data

US 2011/0244327 A1 Oct. 6, 2011

(30) Foreign Application Priority Data

Apr. 1, 2010 (JP) ................. 2010-084853

(51) Int. Cl.
*H01M 2/16* (2006.01)

(52) U.S. Cl.
USPC ........ 429/137; 429/302; 429/209; 429/218.1; 429/231.95; 429/252

(58) Field of Classification Search
USPC ............. 429/137, 141, 144, 302, 209, 218.1, 429/231.95, 252
See application file for complete search history.

(56) References Cited

U.S. PATENT DOCUMENTS

| 2007/0059601 A1 | 3/2007 | Natsume et al. | |
| 2009/0117472 A1* | 5/2009 | Iwamoto | 429/246 |
| 2009/0148778 A1* | 6/2009 | Kawase et al. | 429/330 |

FOREIGN PATENT DOCUMENTS

| JP | 2004-349162 A | 12/2004 |
| JP | 2004-349237 A | 12/2004 |

\* cited by examiner

*Primary Examiner* — Patrick Ryan
*Assistant Examiner* — Ben Lewis
(74) *Attorney, Agent, or Firm* — Westerman, Hattori, Daniels & Adrian, LLP

(57) ABSTRACT

A lithium secondary battery includes a negative electrode, a positive electrode, and an electrolyte. The negative electrode includes a negative electrode current collector and a negative electrode active material layer. The negative electrode active material layer is provided on the negative electrode current collector. The negative electrode active material layer contains silicon and oxygen. A low oxygen content layer is provided in a portion of the negative electrode active material layer on the negative electrode current collector side, the low oxygen content layer having an oxygen content lower than that of the remaining portion of the negative electrode active material layer. The thickness of the low oxygen content layer is 25% or less of the thickness of the negative electrode active material layer.

15 Claims, 5 Drawing Sheets

LITHIUM SECONDARY BATTERY

CROSS REFERENCE TO RELATED APPLICATIONS

The present invention contains subject matter related to Japanese Patent Application No. 2010-084853 filed in the Japan Patent Office on Apr. 1, 2010, the entire contents of which are incorporated herein by reference.

BACKGROUND OF THE INVENTION

1. Field of the Invention

The present invention relates to a lithium secondary battery. In particular, the present invention relates to a lithium secondary battery in which a negative electrode active material containing silicon and oxygen is used.

2. Description of Related Art

Recently, with regard to a secondary battery having a high output and a high energy density, studies on lithium secondary batteries have been actively conducted. In lithium secondary batteries, charging and discharging are performed by causing lithium ions to move between a positive electrode and a negative electrode in a non-aqueous electrolyte solution.

Hitherto, graphite materials have been widely used as a negative electrode active material of lithium secondary batteries. However, when graphite materials are used as the negative electrode active material, it is difficult to sufficiently increase the capacity of the lithium secondary batteries. In view of this problem, studies on negative electrode active materials having a capacity higher than that of graphite materials have been actively conducted.

Examples of materials that have been proposed as negative electrode active materials alternative to graphite materials include silicon, germanium, and tin, all of which are materials that occlude lithium by forming an alloy with lithium. Among these, materials containing silicon are particularly considered to be promising materials because they have a particularly high theoretical capacity.

However, in such a negative electrode active material, e.g., silicon, which forms an alloy with lithium, the volume of the negative electrode active material changes with occlusion and release of lithium. Consequently, in a lithium secondary battery including such a negative electrode active material that forms an alloy with lithium, contact failure between a negative electrode active material layer and a negative electrode current collector tends to occur with the change in the volume of the negative electrode active material due to charging and discharging. Thus, a charge/discharge cycle lifetime may be shortened.

In view of the above problem, for example, Japanese Published Unexamined Patent Application No. 2004-349237 (Patent Document 1) discloses a negative electrode active material layer composed of a silicon oxide $SiO_x$ ($0.5 \leq x < 1$) thin film formed by vacuum deposition or sputtering.

As described in Patent Document 1, by using a negative electrode active material containing oxygen together with silicon, a charge/discharge cycle lifetime can be extended, as compared with the case where a silicon-containing negative electrode active material layer that does not contain oxygen is used. However, when the negative electrode active material containing oxygen together with silicon is used, an irreversible capacity in the initial charging and discharging increases. Accordingly, an initial charge/discharge efficiency tends to be low.

BRIEF SUMMARY OF THE INVENTION

An object is to provide a lithium secondary battery including a negative electrode active material containing silicon and oxygen, in which a charge/discharge cycle lifetime is long and an initial charge/discharge efficiency is high.

In general, in a lithium secondary battery in which a negative electrode active material containing silicon and oxygen is used, the charge/discharge cycle lifetime and the initial charge/discharge efficiency have a trade-off relationship. More specifically, with an increase in the proportion of oxygen contained in the negative electrode active material, the charge/discharge cycle lifetime is extended, but the initial charge/discharge efficiency tends to be low. Therefore, in general, it has been believed that, in such a lithium secondary battery in which a negative electrode active material containing silicon and oxygen is used, it is difficult to realize both a long charge/discharge cycle lifetime and a high initial charge/discharge efficiency.

However, the inventor of the present invention conducted intensive studies and found that, even when a portion having a low oxygen content is provided in a negative electrode active material layer, the charge/discharge cycle lifetime does not decrease. This finding led to the completion of the present invention.

A lithium secondary battery according to an aspect of the present invention includes a negative electrode, a positive electrode, and an electrolyte. The negative electrode includes a negative electrode current collector and a negative electrode active material layer. The negative electrode active material layer is provided on the negative electrode current collector. The negative electrode active material layer contains silicon and oxygen. A low oxygen content layer is provided in a portion of the negative electrode active material layer on the negative electrode current collector side, the low oxygen content layer having an oxygen content lower than that of the remaining portion of the negative electrode active material layer. The thickness of the low oxygen content layer is 25% or less of the thickness of the negative electrode active material layer.

According to an aspect of the present invention, by providing the low oxygen content layer having a thickness 25% or less of the thickness of a negative electrode active material layer in a portion of the negative electrode active material layer on the negative electrode current collector side, the initial charge/discharge efficiency can be increased while maintaining a charge/discharge cycle lifetime substantially the same as that in the case where the low oxygen content layer is not provided. Thus, it is possible to realize a lithium secondary battery in which the charge/discharge cycle lifetime is long and the initial charge/discharge efficiency is high.

For example, in the case where the low oxygen content layer is provided in a surface layer portion of the negative electrode active material layer on the side opposite to that of the negative electrode current collector, even when the thickness of the low oxygen content layer is only 25% or less of the thickness of the negative electrode active material layer, the charge/discharge cycle lifetime is shortened. Also, when the thickness of the low oxygen content layer exceeds 25% of the thickness of the negative electrode active material layer, the charge/discharge cycle lifetime is shortened.

When a negative electrode active material containing silicon and oxygen is used, in order to maintain a charge/discharge cycle lifetime substantially the same as that in the case where the low oxygen content layer is not provided in the negative electrode active material layer, it is essential to satisfy the following two conditions:

(1) The low oxygen content layer is provided in a portion of the negative electrode active material layer on the negative electrode current collector side.

(2) The thickness of the low oxygen content layer is 25% or less of the thickness of the negative electrode active material layer.

In the low oxygen content layer, the oxygen content may not be uniform. For example, the low oxygen content layer may include a portion having a relatively high oxygen content and a portion having a relatively low oxygen content. In the case where the oxygen content is not uniform in the low oxygen content layer, the average oxygen content of a portion of 25% of the negative electrode active material layer on the negative electrode current collector side is lower than the average oxygen content of the remaining portion.

In an embodiment of the present invention, the term "oxygen content in the low oxygen content layer" refers to the average oxygen content in the low oxygen content layer. The term "oxygen content in the remaining portion other than the low oxygen content layer of the negative electrode active material layer" refers to the average oxygen content in the remaining portion other than the low oxygen content layer of the negative electrode active material layer.

When the oxygen content in the low oxygen content layer is too high, the initial charge/discharge efficiency may decrease. The oxygen content in the low oxygen content layer is preferably 10% by mass or less, more preferably 2% by mass or less, and still more preferably 1% by mass or less.

From the standpoint of extending the charge/discharge cycle lifetime, the oxygen content in the remaining portion other than the low oxygen content layer of the negative electrode active material layer is preferably high. However, when the oxygen content in the remaining portion other than the low oxygen content layer of the negative electrode active material layer is too high, the electron conductivity of a negative electrode active material decreases, which may result in difficulty in charging and discharging. For this reason, the oxygen content in the remaining portion other than the low oxygen content layer of the negative electrode active material layer is preferably 45% by mass or less. The oxygen content in the remaining portion other than the low oxygen content layer of the negative electrode active material layer is more preferably in the range of 15% to 30% by mass.

From the standpoint of extending the charge/discharge cycle lifetime, the oxygen content in the negative electrode active material layer is preferably high, and the proportion of the low oxygen content layer in the negative electrode active material layer is preferably small. However, when the proportion of the low oxygen content layer in the negative electrode active material layer is too small, the effect of improving the initial charge/discharge efficiency may not be sufficiently achieved. For this reason, the thickness of the low oxygen content layer is preferably 5% or more of the thickness of the negative electrode active material layer, and more preferably 8% or more of the thickness of the negative electrode active material layer.

In the lithium secondary battery, irregularities are preferably formed on a surface of the negative electrode current collector on the negative electrode active material layer side. In addition, a void diverging toward a recess of the irregularities formed on the surface of the negative electrode current collector in the thickness direction of the negative electrode active material layer is preferably formed in the negative electrode active material layer. In a lithium secondary battery having such a negative electrode structure, a surface layer portion of the negative electrode active material layer on the side opposite to that of the negative electrode current collector tends to be degraded by a reaction between the surface layer portion and an electrolyte solution. In an embodiment of the present invention, this surface layer portion is a portion having a high content of oxygen, which has an effect of suppressing the reaction with the electrolyte solution. Therefore, it is possible to effectively suppress the degradation of the surface layer portion of the negative electrode active material layer on the side opposite to that of the negative electrode current collector. Thus, an embodiment of the present invention is particularly effective for a lithium secondary battery having the above negative electrode structure.

The negative electrode active material layer having the above structure can be formed by a method for forming a thin film, such as a chemical vapor deposition (CVD) method, a sputtering method, or a vacuum evaporation method. In particular, the negative electrode active material layer is preferably composed of a film formed by a sputtering method. This is because the oxygen content in the negative electrode active material layer can be properly controlled by using a sputtering method.

The negative electrode current collector, the positive electrode, and the electrolyte are not particularly limited, and, for example, known negative electrode current collector, positive electrode, and electrolyte can be used.

The negative electrode current collector may be formed of, for example, a metal foil made of a metal such as copper, nickel, iron, titanium, cobalt, manganese, tin, silicon; or an alloy made of a combination of these metals. Among these materials, the negative electrode current collector is preferably made of a metal that does not easily form an alloy with lithium. Examples of the metal that does not easily form an alloy with lithium include copper and an alloy containing copper, nickel, and stainless steel. The negative electrode current collector may be formed of a laminate including a plurality of metal layers or alloy layers.

The positive electrode may include a positive electrode current collector and a positive electrode active material layer formed on the positive electrode current collector. The positive electrode current collector may be formed of, for example, a metal foil made of a metal such as copper, nickel, iron, titanium, cobalt, manganese, tin, silicon; or an alloy made of a combination of these metals. Examples of a positive electrode active material contained in the positive electrode active material layer include lithium transition metal oxides and metal oxides that do not contain lithium. Examples of the lithium transition metal oxide include $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$. An example of the metal oxide that does not contain lithium is $MnO_2$. The positive electrode active material layer may contain a binder, a conductive agent, and the like, as required. An example of the binder is polyvinylidene fluoride.

The electrolyte may be composed of, for example, a non-aqueous solution in which a non-aqueous electrolyte is dissolved in a non-aqueous solvent. An example of the non-aqueous electrolyte is lithium hexafluorophosphate ($LiPF_6$). Examples of the non-aqueous solvent include ethylene carbonate (EC), 4-fluoroethylene carbonate (FEC), ethyl methyl carbonate (EMC), and mixed solvents thereof.

According to an embodiment of the present invention, it is possible to provide a lithium secondary battery including a negative electrode active material containing silicon and oxygen, in which a charge/discharge cycle lifetime is long and an initial charge/discharge efficiency is high.

DETAILED DESCRIPTION OF THE INVENTION

Figure 1:
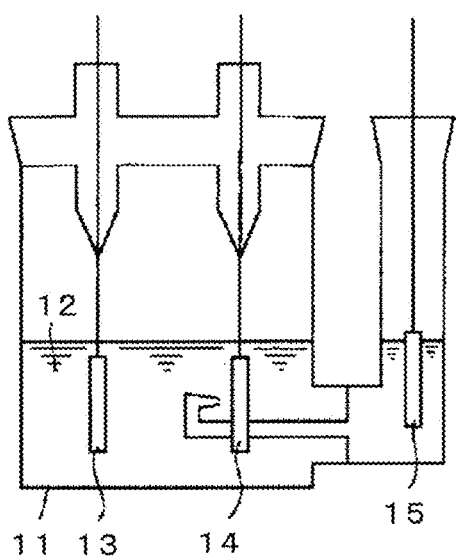
FIG. 1 is a schematic view of a three-electrode cell used in an evaluation of the maximum charge capacity.

The present invention will now be described with reference to examples. The present invention is not limited to experimental examples below and can be carried out with modifications without departing from the scope of the present invention.

The reason why the rolled foil with a roughened surface was used as the negative electrode current collector in this experimental example is to increase in the contact area between the negative electrode current collector and a negative electrode active material layer, so that adhesion between the negative electrode current collector and the negative electrode active material layer, which is separated in the form of columns, is satisfactorily maintained during charge/discharge cycles.

Next, the negative electrode active material layer was formed on the negative electrode current collector by a sputtering method under the conditions below to obtain a negative electrode. In this experimental example, a sputtering apparatus provided with a DC-pulse power supply and a rotating drum having a diameter of 700 mm and facing a target was used. Boron-doped single-crystal silicon having a specific resistance of 0.01 $\Omega \cdot cm$ was used as the target.

(Conditions for Sputtering Method)

Pressure: 0.2 Pa

DC pulse power: 2,000 W

DC pulse frequency: 100 kHz

DC pulse width: 1,696 nanoseconds

Drum rotational speed: 1.25 rpm

TABLE 1

| | Structure of negative electrode active material layer | | Deposition time (min) | Thickness ($\mu m$) | Occupancy of low O content layer (%) |
|---|---|---|---|---|---|
| Negative electrode A1 | Second layer: High O content layer (27%) | First layer | 38 | 0.6 | 8 |
| | First layer: Low O content layer (1%) | Second layer | 342 | 6.6 | |
| Negative electrode A2 | | First layer | 76 | 1.1 | 16 |
| | | Second layer | 304 | 5.8 | |
| Negative electrode A3 | | First layer | 152 | 2.3 | 34 |
| | | Second layer | 228 | 4.4 | |
| Negative electrode A4 | | First layer | 228 | 3.4 | 54 |
| | | Second layer | 152 | 2.9 | |
| Negative electrode A5 | | First layer | 304 | 4.6 | 75 |
| | | Second layer | 76 | 1.5 | |
| Negative electrode B1 | Second layer: Low O content layer (1%) | First layer | 76 | 1.5 | 75 |
| | First layer: High O content layer (27%) | Second layer | 304 | 4.6 | |
| Negative electrode B2 | | First layer | 152 | 2.9 | 54 |
| | | Second layer | 228 | 3.4 | |
| Negative electrode B3 | | First layer | 228 | 4.4 | 34 |
| | | Second layer | 152 | 2.3 | |
| Negative electrode B4 | | First layer | 304 | 5.8 | 16 |
| | | Second layer | 76 | 1.1 | |
| Negative electrode C | Only low O content layer (1%) | | 380 | 5.7 | 100 |
| Negative electrode D | Only high O content layer (27%) | | 380 | 7.3 | 0 |
| Negative electrode E | Second layer: High O content layer (17%) | First layer | 76 | 1.1 | 17 |
| | First layer: Low O content layer (1%) | Second layer | 304 | 5.4 | |
| Negative electrode F | Only high O content layer (17%) | | 380 | 6.6 | 0 |

(1) Preparation of Negative Electrode

As a negative electrode current collector, a C7025 alloy rolled foil, the surface of which was roughened by depositing copper by an electrolytic method, was used. The thickness of the rolled foil before the roughening of the surface was 18 $\mu m$. The thickness of the rolled foil after the roughening of the surface was 28 $\mu m$.

The arithmetical mean deviation of the profile Ra of the surface of the negative electrode current collector was measured with a laser microscope. The arithmetical mean deviation of the profile Ra was 0.6 $\mu m$.

In the preparation of negative electrodes A1 to A5 and negative electrode E, first, a low oxygen content layer (low O content layer) was formed on the negative electrode current collector, and a high oxygen content layer (high O content layer) was further formed thereon. On the other hand, in the preparation of negative electrodes B1 to B4, first, a high oxygen content layer (high O content layer) was formed on the negative electrode current collector, and a low oxygen content layer (low O content layer) was further formed thereon. In the preparation of negative electrode C, only a low oxygen content layer (low O content layer) was formed on the negative electrode current collector. In the preparation of negative electrode D and negative electrode F, only a high oxygen content layer (high O content layer) was formed on the negative electrode current collector.

In the formation of the low oxygen content layers in negative electrodes A1 to A5, negative electrodes B1 to B4, negative electrode C, and negative electrode E, only argon gas (50 sccm) was supplied into a chamber of the sputtering apparatus. On the other hand, in the formation of the high oxygen content layers in negative electrodes A1 to A5, negative electrodes B1 to B4, and negative electrode D, argon gas (43 sccm) and oxygen gas (20 sccm) were supplied into the chamber of the sputtering apparatus. In the formation of the high oxygen content layers in negative electrode E and negative electrode F, argon gas (47 sccm) and oxygen gas (10 sccm) were supplied into the chamber of the sputtering apparatus. The oxygen content in the low oxygen content layer was 1% by mass. On the other hand, in negative electrodes A1 to A5, negative electrodes B1 to B4, and negative electrode D, the oxygen content in the high oxygen content layers was 27% by mass. In negative electrode E and negative electrode F, the oxygen content in the high oxygen content layers was 17% by mass.

The thicknesses of the negative electrode active material layers in negative electrodes C, D, and F shown in Table 1 are values measured by the following method. In the preparation of each of the negative electrode active material layers, a silicon oxide film was deposited in the same manner on a silicon wafer, the surface of which was partially covered with a tape. The tape was then peeled off, and a step formed at a boundary between an area that was covered with the tape and an area that was not covered with the tape was measured with a surface profiler. Thus, the thickness of each of the negative electrode active material layers was measured.

The thicknesses of the low oxygen content layers and the thicknesses of the high oxygen content layers in negative electrodes A1 to A5, negative electrodes B1 to B4, and negative electrode E were calculated from the thicknesses of the negative electrode active material layers in negative electrodes C, D, and F and the deposition times. The total thicknesses of the negative electrode active material layers of negative electrodes A1 to A5, negative electrodes B1 to B4, and negative electrode E were also measured as in negative electrodes C, D, and F. The measurement results coincided with the total of the above calculated thicknesses of the low oxygen content layer and the high oxygen content layer.

The oxygen content of the negative electrode active material layer in negative electrodes C, D, and F are values measured by the following method. First, each of negative electrodes C, D, and F was cut to a size of 10 mm×20 mm, and the oxygen content (mass) of each of whole negative electrodes C, D, and F was measured with an RO-600 oxygen determinator manufactured by LECO Corporation. Next, each of negative electrodes C, D, and F and a negative electrode current collector on which no negative electrode active material was formed was cut to a size of 20 mm×100 mm, and the masses of these negative electrodes and negative electrode current collector were measured. The masses of the negative electrode active materials in negative electrodes C, D, and F were then calculated from a difference in the mass between the negative electrode current collector and each of negative electrodes C, D, and F. Next, the oxygen contents (% by mass) of the negative electrode active materials were calculated from each of the oxygen contents of whole negative electrodes C, D, and F measured above and the mass of the corresponding negative electrode active material. It is assumed that, when the composition of gas introduced into the chamber of the sputtering apparatus is not changed, the oxygen content of the resulting silicon oxide film remain the same. Accordingly, the above-calculated oxygen content of the negative electrode active material in negative electrode C was assumed to be the oxygen content in the low oxygen content layer in negative electrodes A1 to A5, negative electrodes B1 to B4, and negative electrode E. The above-calculated oxygen content of the negative electrode active material in negative electrode D was assumed to be the oxygen content in the high oxygen content layer in negative electrodes A1 to A5 and negative electrodes B1 to B4. The above-calculated oxygen content of the negative electrode active material in negative electrode F was assumed to be the oxygen content in the high oxygen content layer in negative electrode E.

(2) Evaluation of Maximum Charge Capacity

A maximum charge capacity of the low oxygen content layer and the high oxygen content layers were evaluated using negative electrodes C, D, and F.

(2)-1 Preparation of Three-Electrode Cell

First, a three-electrode cell shown in FIG. 1 was prepared using each of negative electrodes C, D, and F. The three-electrode cell includes a counter electrode 13, a working electrode 14, and a reference electrode 15, all of which are immersed in an electrolyte solution 12 in a case 11. The working electrode 14 was prepared as follows. A nickel lead wire was attached to each of negative electrodes C, D, and F having a size of 20 mm×20 mm, and the resulting negative electrodes were then dried at 110° C. for two hours under vacuum. Lithium metal was used as the counter electrode 13 and the reference electrode 15. The electrolyte solution 12 was prepared as follows. Lithium hexafluorophosphate (LiPF$_6$) was dissolved at a concentration of 1 mol/L in a solvent prepared by mixing ethylene carbonate with diethyl carbonate at a volume ratio of 3:7.

(2)-2 Evaluation of Maximum Charge Capacity

The three-electrode cell was charged at a constant current of 0.25 mA/cm$^2$ at room temperature until the potential of the working electrode 14 reached 0 (V vs. Li/Li$^+$), and a maximum charge capacity was measured. The maximum charge capacity corresponds to the maximum amount of lithium occluded in the negative electrode active material, and is a charge capacity when a current is supplied until the potential of the negative electrode with respect to metal lithium becomes 0 V. Note that, herein, the reduction of the working electrode 14 is defined as charging.

In each of negative electrodes C, D, and F, the maximum charge capacity per square centimeter of the area of the negative electrode active material layer was 5 mAh.

It is believed that the maximum charge capacity is proportional to the thickness of the negative electrode active material layer. Accordingly, in negative electrodes A1 to A5 and negative electrodes B1 to B4, in which the thickness of the negative electrode active material layer is the same as that of negative electrodes C and D, the maximum charge capacity per square centimeter of the area of the negative electrode active material layer is also believed to be 5 mAh, similarly to negative electrodes C and D.

(3) Charge/Discharge Test (3)-1 Fabrication of Lithium Secondary Batteries

Figure 2:
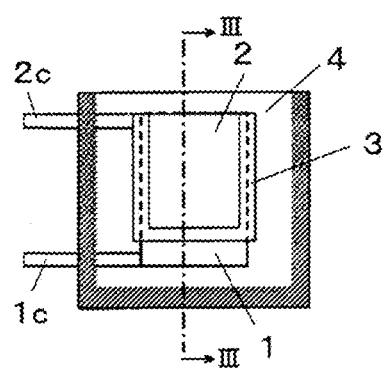
FIG. 2 is a schematic plan view of a lithium secondary battery.
Figure 3:
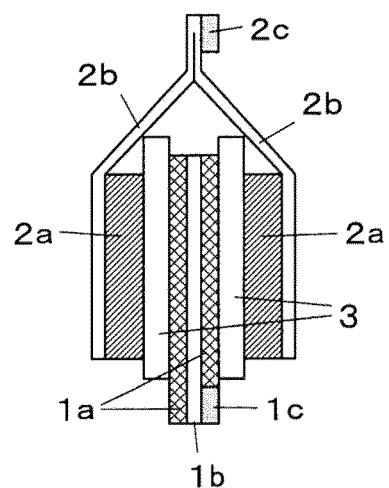
FIG. 3 is a schematic cross-sectional view taken along line III-III in FIG. 2.
Figure 4:
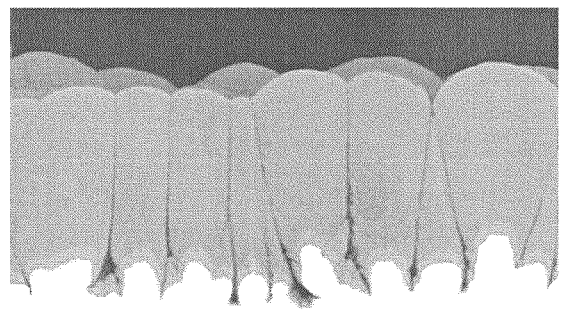
FIG. 4 is a backscattered electron image of a cross section of negative electrode A1 before charging and discharging.
Figure 4:
Figure 5:
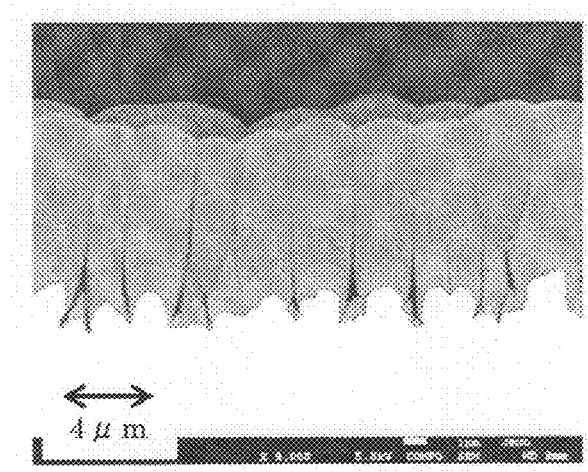
FIG. 5 is a backscattered electron image of a cross section of negative electrode A2 before charging and discharging.
Figure 6:
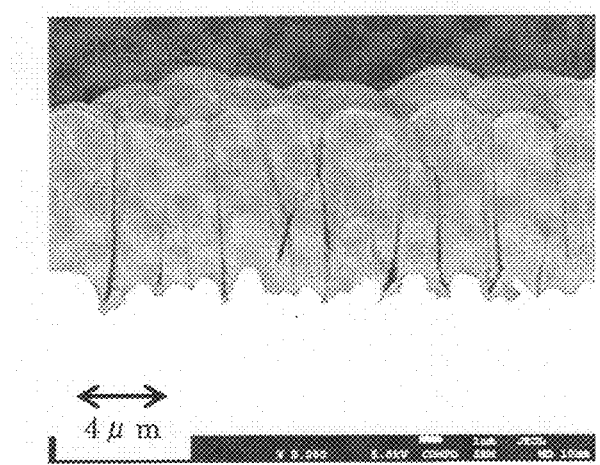
FIG. 6 is a backscattered electron image of a cross section of negative electrode A3 before charging and discharging.
Figure 7:
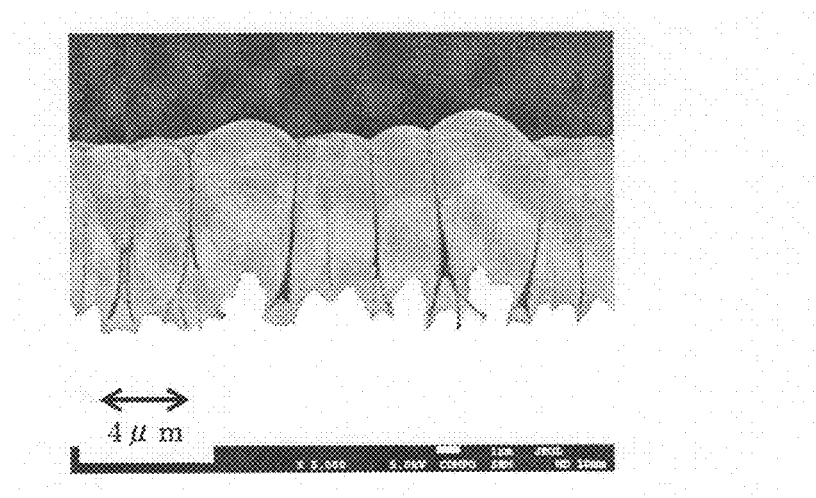
FIG. 7 is a backscattered electron image of a cross section of negative electrode A4 before charging and discharging.
Figure 8:
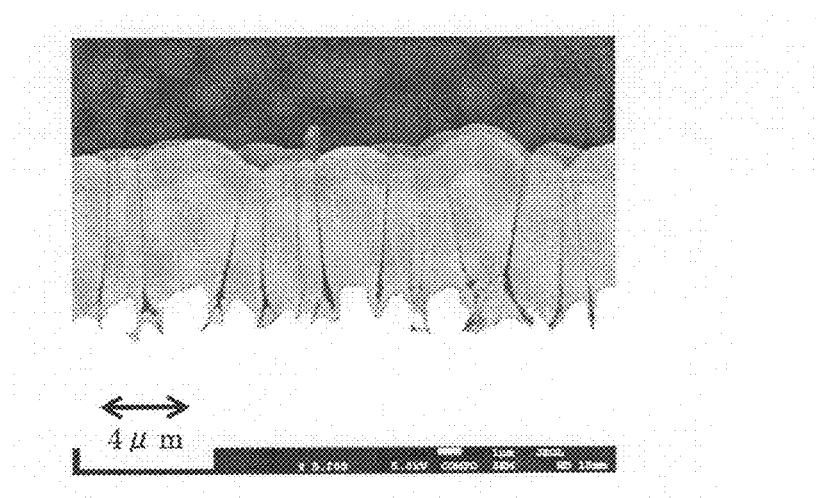
FIG. 8 is a backscattered electron image of a cross section of a negative electrode A5 before charging and discharging.

Lithium secondary batteries a1, a2, d, e, and f each having the structure shown in FIGS. 2 and 3 were fabricated using negative electrodes A1, A2, D, E, and F, respectively.

First, negative electrodes A1, A2, D, E, and F were cut to a size of 30 mm in width and 25 mm in length. A nickel flat plate functioning as a negative electrode current collector tab was attached to an end in the width direction of each of the negative electrodes. Thus, negative electrodes for a lithium secondary battery for evaluation were prepared.

Next, a positive electrode was prepared. A positive electrode active material in which zirconium was bonded to the surfaces of particles of a lithium cobalt compound oxide represented by $LiCoO_2$ (average particle diameter 13 μm) was used. More specifically, $Li_2CO_3$, $Co_3O_4$, and $ZrO_2$ were mixed with an Ishikawa-type Raikai mortar, the resulting mixture was heat-treated in an air atmosphere at 850° C. for 24 hours and then pulverized. The pulverized mixture was used as the positive electrode active material. This positive electrode active material, a carbon material powder functioning as a conductive agent, and polyvinylidene fluoride functioning as a binder were added to N-methyl-2-pyrrolidone functioning as a dispersing agent so that the ratio active material:conductive agent:binder=94:3:3 by weight, and the resulting mixture was then kneaded to prepare a positive electrode mixture slurry. The positive electrode mixture slurry was then applied onto a surface of aluminum foil functioning as a positive electrode current collector and having a thickness of 15 μm. The aluminum foil was dried and then rolled to obtain a positive electrode plate. This positive electrode plate was cut to a size of 50 mm in width and 20 mm in length. A portion of the resulting positive electrode active material layer located in a central area having a size of 10 mm in the width direction was removed, and an aluminum flat plate was attached, as a positive electrode current collector tab, to the portion from which the positive electrode active material layer had been removed. Thus, the positive electrode was prepared.

In order to make the initial discharge capacity uniform in fabricated lithium secondary batteries, the mass of each of the positive electrode active material layers formed on the corresponding positive electrode current collector was controlled to be in the range of 13 to 20 $mg/cm^2$. The packing density was controlled to be 3.75 $g/cm^3$.

An electrolyte solution was prepared as follows. Lithium hexafluorophosphate ($LiPF_6$) was dissolved at a concentration of 1 mol/L in a solvent prepared by mixing ethylene carbonate, diethyl carbonate, and fluoroethylene carbonate at a volume ratio of 27:63:10.

Next, lithium secondary batteries for evaluation were assembled using the above positive electrode, the negative electrode, and other components. First, a battery case 4 was prepared by using a laminate film in which both surfaces of an aluminum metal sheet were coated with a polypropylene resin. Next, as shown in FIG. 3, both surfaces of a negative electrode 1 including negative electrode active material layers 1a, a negative electrode current collector 1b, and a negative electrode current collector tab 1c was sandwiched by a positive electrode 2 including a positive electrode active material layer 2a, a positive electrode current collector 2b, and a positive electrode current collector tab 2c such that a negative electrode active material layer 1a and a positive electrode active material layer 2a face each other with a separator 3 therebetween. The negative electrode 1, the positive electrode 2, and the separators 3 were housed in the battery case 4 in this state. Next, the negative electrode current collector tab 1c and the positive electrode current collector tab 2c were led to the outside of the battery case 4, and 600 μL of the above electrolyte solution was injected in the battery case 4. The battery case 4 was then heat-sealed to fabricate a lithium secondary battery. The facing area of the positive electrode 2 and the negative electrode 1 was 8 $cm^2$.

In the lithium secondary batteries a1, a2, d, e, and f, the amount of mixture layer of the positive electrode 2 used in combination with the negative electrode 1 was adjusted to be in the range of 13 to 20 $mg/cm^2$. The amount of mixture layer of the positive electrode 2 used in each of the lithium secondary batteries a1, a2, d, e, and f are shown in Table 2 below.

(3)-2 Charge/Discharge Test

A charge/discharge test was conducted using each of the lithium secondary batteries a1, a2, d, e, and f fabricated above by the following procedure.

First, initial charging and discharging were performed for each of the lithium secondary batteries a1, a2, d, e, and f. Each of the lithium secondary batteries a1, a2, d, e, and f was charged (subjected to a constant-current charging) at room temperature at a current shown in Table 3 up to 4.2 V, and then charged (subjected to a constant-voltage charging) until the current became a charging stop current shown in Table 3 while maintaining the voltage at 4.2 V. Subsequently, the lithium secondary batteries were discharged at the current shown in Table 3 down to 2.75 V. The discharge capacity (initial discharge capacity) and charge/discharge efficiency (initial charge/discharge efficiency) in the initial charging and discharging are shown in Table 2 below. The initial charge/discharge efficiency shown in Table 2 is a value (%) obtained by dividing the discharge capacity in the initial charging and discharging by the charge capacity.

Fifty charge/discharge cycles were performed by the same procedure as the above-described initial charging and discharging. However, in the second cycle and the subsequent cycles, the current in the constant-current charging and the constant-current discharging was changed to a current corresponding to a current value at which the lithium secondary battery would consume the discharge capacity in the initial charging and discharging in one hour. In addition, the charging stop current in the constant-voltage charging was changed to a current corresponding to a current value at which the lithium secondary battery would consume the discharge capacity in the initial charging and discharging in twenty hours. A capacity retention ratio (%) in the fifty cycles, the capacity retention ratio being represented as a value when the discharge capacity in the second cycle was assumed to be 100%, was determined. The capacity retention ratio after fifty cycles is shown in Table 2.

TABLE 2

|  | Negative electrode | Occupancy of low O content layer (%) | Amount of mixture layer of positive electrode $(mg/cm^2)$ | Initial discharge capacity $(mAh/cm^2)$ | Initial charge/discharge efficiency (%) | Capacity retention ratio (%) |
|---|---|---|---|---|---|---|
| Battery a1 | A1 | 8 | 20 | 1.9 | 61 | 97 |
| Battery a2 | A2 | 16 | 20 | 2.0 | 62 | 97 |
| Battery d | D | 0 | 20 | 2.0 | 59 | 97 |
| Battery e | E | 17 | 20 | 2.2 | 73 | 93 |
| Battery f | F | 0 | 16 | 1.9 | 69 | 92 |

TABLE 3

| Amount of mixture layer of positive electrode (mg/cm²) | Current in constant-current charging and discharging (mA) | Charging stop current in constant-voltage charging (mA) |
| --- | --- | --- |
| 13 | 2.8 | 0.7 |
| 16 | 3.6 | 0.9 |
| 20 | 4.4 | 1.1 |

Next, lithium secondary batteries a3 to a5, lithium secondary batteries b1 to b4, and lithium secondary battery c including negative electrodes A3 to A5, negative electrodes B1 to B4, and negative electrode C, respectively, were also fabricated as in lithium secondary batteries a1, a2, d, e, and f, and the same charge/discharge test was conducted. The results are shown in Table 4 together with the results of lithium secondary batteries a1, a2, d, e, and f.

TABLE 4

| | Negative electrode | Occupancy of low O content layer (%) | Amount of mixture layer of positive electrode (mg/cm²) | Initial discharge capacity (mAh/cm²) | Capacity retention ratio (%) |
| --- | --- | --- | --- | --- | --- |
| Battery a1 | A1 | 8 | 20 | 1.9 | 97 |
| Battery a2 | A2 | 16 | 20 | 2.0 | 97 |
| Battery a3 | A3 | 34 | 20 | 2.1 | 91 |
| Battery a4 | A4 | 54 | 16 | 1.9 | 91 |
| Battery a5 | A5 | 74 | 16 | 2.0 | 89 |
| Battery b1 | B1 | 74 | 16 | 2.0 | 92 |
| Battery b2 | B2 | 54 | 16 | 1.8 | 94 |
| Battery b3 | B3 | 34 | 20 | 2.0 | 94 |
| Battery b4 | B4 | 16 | 20 | 1.9 | 92 |
| Battery c | C | 100 | 13 | 2.0 | 92 |
| Battery d | D | 0 | 20 | 2.0 | 97 |
| Battery e | E | 17 | 20 | 2.2 | 93 |
| Battery f | F | 0 | 16 | 1.9 | 92 |

As shown in Table 2, in lithium secondary batteries a1 and a2, in which the low oxygen content layer was disposed on the negative electrode current collector side and the thickness of the low oxygen content layer was 25% or less of the thickness of the negative electrode active material layer, despite the presence of the low oxygen content layer, lithium secondary batteries a1 and a2 showed a capacity retention ratio (charge/discharge cycle lifetime) substantially the same as that of lithium secondary battery d, which did not include a low oxygen content layer. In addition, since the low oxygen content layer was provided in lithium secondary batteries a1 and a2, the initial charge/discharge efficiencies of these lithium secondary batteries were higher than the initial charge/discharge efficiency of lithium secondary battery d. Also, in lithium secondary battery e, in which the low oxygen content layer was disposed on the negative electrode current collector side and the thickness of the low oxygen content layer was 25% or less of the thickness of the negative electrode active material layer, despite the presence of the low oxygen content layer, the lithium secondary battery showed a capacity retention ratio (charge/discharge cycle lifetime) substantially the same as that of lithium secondary battery f, which did not include a low oxygen content layer. In addition, since the low oxygen content layer was provided in lithium secondary battery e, the initial charge/discharge efficiency of lithium secondary battery e was higher than that of lithium secondary battery f.

In contrast, in lithium secondary batteries a3 to a5, in which the low oxygen content layer was disposed on the negative electrode current collector side but the thickness of the low oxygen content layer was more than 25% of the thickness of the negative electrode active material layer, as shown in Table 4, the capacity retention ratios of lithium secondary batteries a3 to a5 were lower than the capacity retention ratio of lithium secondary battery d.

In lithium secondary batteries b1 to b4, in which the low oxygen content layer was disposed on the side opposite to that of the negative electrode current collector, regardless of the thickness of the low oxygen content layer, the capacity retention ratios of lithium secondary batteries b1 to b4 were lower than the capacity retention ratio of lithium secondary battery d. Similarly, in lithium secondary battery c, which did not include a high oxygen content layer, the capacity retention ratio of lithium secondary battery c was lower than that of lithium secondary battery d.

As is apparent from the above results, by providing a low oxygen content layer having a thickness equal to or less than 25% of the negative electrode active material layer in a portion of the negative electrode active material layer on the negative electrode current collector side, the initial charge/discharge efficiency can be increased while maintaining a charge/discharge cycle lifetime substantially the same as that in the case where the low oxygen content layer is not provided.

(4) Structure of Negative Electrode

FIGS. 4 to 8 are backscattered electron images of cross sections of negative electrodes A1 to A5 before charging and discharging. The color tone of brightness and darkness appearing on a backscattered electron image of a cross section of an active material varies depending on the difference in the structures (composition and density) of the active material. Therefore, images of a low oxygen content layer and a high oxygen content layer have different color tones. In the backscattered electron images of FIGS. 4 to 8, bright portions at the bottom side are low oxygen content layers, and dark portions are high oxygen content layers.

In the backscattered electron images of FIGS. 4 to 8, it is confirmed that voids diverging toward recesses of irregularities formed on the surface of the negative electrode current collector in the thickness direction of the negative electrode active material layer are formed in the negative electrode active material layer.

Figure 9:
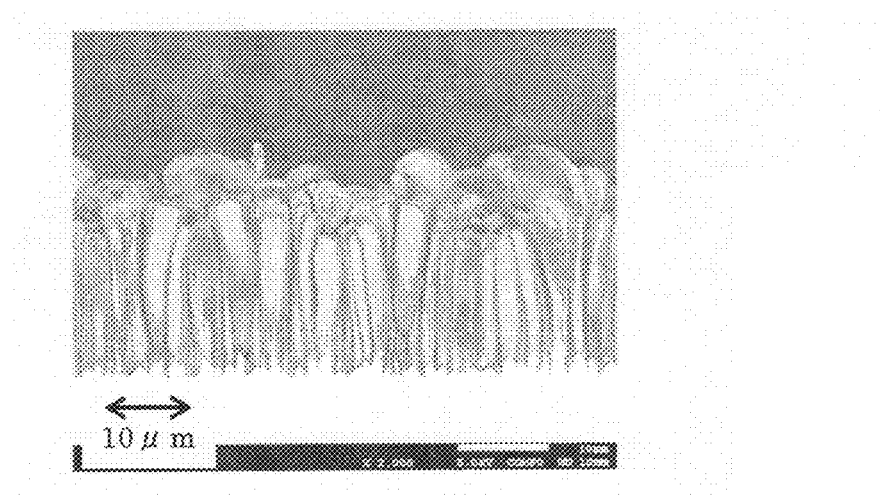
FIG. 9 is a backscattered electron image of a cross section of negative electrode C of a lithium secondary battery whose capacity retention ratio was decreased to 70%.
Figure 10:
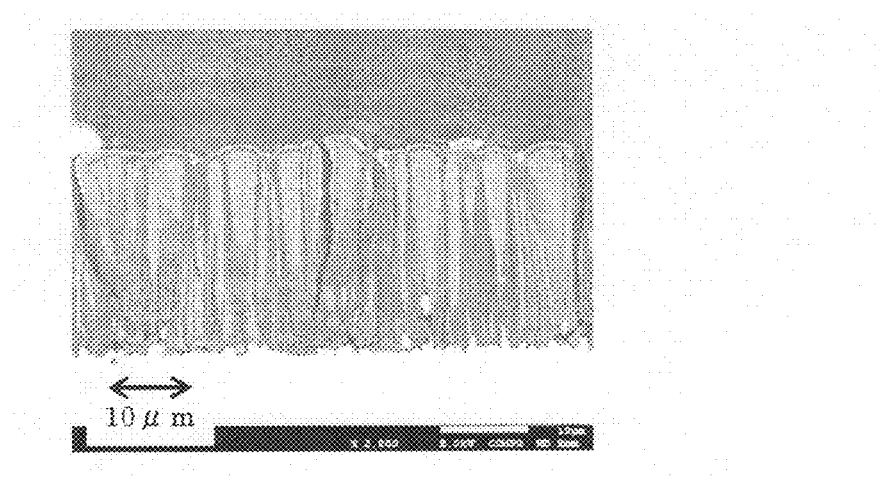
FIG. 10 is a backscattered electron image of a cross section of negative electrode D of a lithium secondary battery whose capacity retention ratio was decreased to 70%.

FIG. 9 is a backscattered electron image of a cross section of negative electrode C of a lithium secondary battery whose capacity retention ratio was decreased to 70%. FIG. 10 is a backscattered electron image of a cross section of negative electrode D of a lithium secondary battery whose capacity retention ratio was decreased to 70%.

In FIGS. 9 and 10, dark portions correspond to portions where the negative electrode active material was degraded by an irreversible reaction between the negative electrode active material and the electrolytic solution caused by repeating occlusion and release of lithium during charging and discharging. In FIGS. 9 and 10, bright portions correspond to portions where the negative electrode active material was not degraded. The results shown in FIGS. 9 and 10 show that a surface layer portion of the negative electrode active material layer tends to be degraded. Therefore, it is believed that when this surface layer portion, which tends to be degraded, is composed of a high oxygen content layer having a high oxygen content, a high charge/discharge cycle lifetime can be achieved while suppressing the degradation of the negative electrode active material layer.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A lithium secondary battery comprising:
a negative electrode including a negative electrode current collector and a negative electrode active material layer containing silicon and oxygen, the negative electrode active material layer being provided on the negative electrode current collector;
a positive electrode; and
an electrolyte,
wherein a low oxygen content layer is provided in a portion of the negative electrode active material layer on the negative electrode current collector side, the low oxygen content layer having an oxygen content lower than that of the remaining portion of the negative electrode active material layer,
the thickness of the low oxygen content layer is 25% or less of the thickness of the negative electrode active material layer, and
the oxygen content in the low oxygen content layer is 2% by mass or less.

2. The lithium secondary battery according to claim 1, wherein the oxygen content in the remaining portion other than the low oxygen content layer of the negative electrode active material layer is 45% by mass or less.

3. The lithium secondary battery according to Claim 2, wherein the oxygen content in the remaining portion other than the low oxygen content layer of the negative electrode active material layer is in the range of 15% to 30% by mass.

4. The lithium secondary battery according to claim 3, wherein the thickness of the low oxygen content layer is 5% or more of the thickness of the negative electrode active material layer.

5. The lithium secondary battery according to claim 2, wherein the thickness of the low oxygen content layer is 5% or more of the thickness of the negative electrode active material layer.

6. The lithium secondary battery according to claim 1, wherein the oxygen content in the remaining portion other than the low oxygen content layer of the negative electrode active material layer is in the range of 15% to 30% by mass.

7. The lithium secondary battery according to claim 6, wherein the thickness of the low oxygen content layer is 5% or more of the thickness of the negative electrode active material layer.

8. The lithium secondary battery according to claim 1, wherein the thickness of the low oxygen content layer is 5% or more of the thickness of the negative electrode active material layer.

9. The lithium secondary battery according to claim 1, wherein irregularities are formed on a surface of the negative electrode current collector on the negative electrode active material layer side, and
a void diverging toward a recess of the irregularities formed on the surface of the negative electrode current collector in the thickness direction of the negative electrode active material layer is formed in the negative electrode active material layer.

10. The lithium secondary battery according to claim 1, wherein the negative electrode active material layer is composed of a film formed by a sputtering method.

11. A lithium secondary battery comprising:
a negative electrode including a negative electrode current collector and a negative electrode active material layer containing silicon and oxygen, the negative electrode active material layer being provided on the negative electrode current collector;
a positive electrode; and
an electrolyte,
wherein a low oxygen content layer is provided in a portion of the negative electrode active material layer on the negative electrode current collector side, the low oxygen content layer having an oxygen content lower than that of the remaining portion of the negative electrode active material layer,
the thickness of the low oxygen content layer is 25% or less of the thickness of the negative electrode active material layer, and
the thickness of the low oxygen content layer is 5% or more of the thickness of the negative electrode active material layer.

12. The lithium secondary battery according to claim 11, wherein irregularities are formed on a surface of the negative electrode current collector on the negative electrode active material layer side, and
a void diverging toward a recess of the irregularities formed on the surface of the negative electrode current collector in the thickness direction of the negative electrode active material layer is formed in the negative electrode active material layer.

13. The lithium secondary battery according to claim 11, wherein the negative electrode active material layer is composed of a film formed by a sputtering method.

14. The lithium secondary battery according to claim 11, wherein the oxygen content in the remaining portion other than the low oxygen content layer of the negative electrode active material layer is 45% by mass or less.

15. The lithium secondary battery according to claim 11, wherein the oxygen content in the remaining portion other than the low oxygen content layer of the negative electrode active material layer is in the range of 15% to 30% by mass.

* * * * *